United States Patent [19]
Röper

[11] Patent Number: 5,654,618
[45] Date of Patent: Aug. 5, 1997

[54] PROCESS FOR THE TWO-DIMENSIONAL DETERMINATION OF A WORK-AREA CONTOUR FOR LATHES

[75] Inventor: Klaus Röper, Wedemark, Germany

[73] Assignee: Dr. Johannes Heidenhain GmbH, Traunreut, Germany

[21] Appl. No.: 624,620

[22] PCT Filed: Sep. 13, 1994

[86] PCT No.: PCT/EP94/03055

§ 371 Date: Mar. 15, 1996

§ 102(e) Date: Mar. 15, 1996

[87] PCT Pub. No.: WO95/08142

PCT Pub. Date: Mar. 23, 1995

[30] Foreign Application Priority Data

Sep. 13, 1993 [DE] Germany ............... 43 31 034.6

[51] Int. Cl.⁶ .................... G05B 19/33; G05B 19/18
[52] U.S. Cl. ............... 318/578; 318/571; 318/572; 364/474.21; 364/474.29; 364/474.32
[58] Field of Search ............... 318/560–696; 364/474.26–474.32, 168, 171, 191, 474.22, 474.21, 474.25; 409/80, 99

[56] References Cited

U.S. PATENT DOCUMENTS

| | | | |
|---|---|---|---|
| 4,575,665 | 3/1986 | Matsuura et al. | 318/578 |
| 4,575,791 | 3/1986 | Schwefel | 318/590 |
| 4,672,551 | 6/1987 | Ookuma et al. | 318/578 |
| 4,998,196 | 3/1991 | Seki et al. | 364/474.21 |
| 5,015,130 | 5/1991 | Matsuura et al. | 318/578 |

FOREIGN PATENT DOCUMENTS

| | | | |
|---|---|---|---|
| 0089561 | 9/1983 | European Pat. Off. | G05B 19/405 |
| 0104409 | 4/1984 | European Pat. Off. | G05B 19/405 |
| 0450113 | 10/1991 | European Pat. Off. | G05B 19/42 |

OTHER PUBLICATIONS

Werkstattechnik, vol. 78, No. 9, Sep. 1988, Berlin/Germany pp. 509–514, "Echtzeit–Kollisionschutzsysteme für NC–Dreh–maschinen" by U. Pilland.

Konstruktion, vol. 37, No. 10, Oct. 1985, Berlin/Germany pp. 387–394, "CAM–Aufgaben lösen mit CAD–Algorithmen" by H. Diedenhoven.

*Primary Examiner*—Paul Ip
*Attorney, Agent, or Firm*—Paul J. Vincent

[57] ABSTRACT

The invention pertains to a process for the two-dimensional determination of a work-area contour for collision monitoring of numerically controlled lathes. Disclosed is a process for the two-dimensional determination of a work-area contour wherein the work-area contour for collision monitoring can be determined at a reasonable cost in computer power: first a safe zone is defined in the form of a segment contour. Defined also is a segment contour that describes the contours of the tool and tool fixtures. Following that, the contour vertices both of the safe zone and of the tool segment contour are defined and stored as coordinate values. The contour vertices thus derived for the safe zone and tool segment contour are overlaid in pairs and for each overlay the coordinate values of a reference point are calculated. From the coordinate values of the segment contour those coordinate values are chosen which when properly combined yield the work-area contour.

8 Claims, 2 Drawing Sheets

PROCESS FOR THE TWO-DIMENSIONAL DETERMINATION OF A WORK-AREA CONTOUR FOR LATHES

BACKGROUND OF THE INVENTION

The invention concerns method for the determination of two-dimensional work-area contours to monitor safe zones for numerically controlled lathes, whereby a safe zone is specified through determination of an axis-parallel segment contour of the workpiece and/or of the environment of the workpiece and a tool segment contour is defined for the portions of the tool including the tool support which are located on the side facing the safe zone and the work-area contour is calculated for a particular reference point of the tool segment contour.

Since collisions normally lead to substantial losses which can be caused both by repair costs as well as by down-time, it is advantageous to avoid these types of collisions through monitoring of the work process.

The use of sensors comprising, for example, one or more cameras for the purpose of collision monitoring is known in the art, the cameras being connected to an image analysis unit for prior recognition of collision events and the prevention thereof. Other sensors are used to determine the forces occurring in a lathe, in particular, at the tool and the tool support.

Image analysis has the disadvantage of being very difficult and therefore expensive and when forces are determined, collisions are first recognized after they have already occurred and have already possibly induced even minor damage.

Methods for the monitoring of collisions are known in the art which function without sensors by providing means for geometrical calculation of possible collision points which are then excluded during the work process. In this fashion, a working region is defined within which one must remain. The disadvantage of this procedure is the high amount of data which must be processed. This leads to large computing times which are prohibitive for online-monitoring unless sufficiently large computing power is available.

With lathes, this large amount of data can be substantially reduced since the lathe process can be largely described by two-dimensional calculations with the working area only being determined two-dimensionally. Despite this simplification, a large amount of data must nevertheless be processed so that online-monitoring is only possible with substantial computer power.

A digitizing method is known in the art from European laid-open publication EP 0 450 113 A1 with which the workpiece is sampled with a probe for recording geometrical data of three dimensional workpieces which are clamped to a machine, the workpiece surroundings also being sampled, with the probe sampled signals being utilized both for generating the workpiece geometrical data as well as to check for collisions with tools which, for their part, can likewise be sampled.

This method has the disadvantage that when utilized, for example, with a plurality of tools for processing a workpiece each change in a work tool requires a new sampling and new construction of a safe zone thereby causing substantial losses in time. Furthermore, the sampled values represent a particular situation which changes, for example, with a subsequent workpiece in the event that the position is even only slightly changed.

It would therefore be desirable to provide a method for the two-dimensional determination of work-area contours with which the work-area contour can be determined for collision monitoring using an acceptable amount of computer power, the method being safe and flexibly applicable.

This purpose is achieved in that at least the outer contour vertices of the safe zone and of the tool segment contour are determined and stored as coordinate values; in a monotonically increasing safe zone, each contour vertex of the safe zone is overlaid with each vertex of the tool segment contour and the coordinate value of the reference point is calculated for each overlay; and a work-area segment contour is determined in that those coordinate values which, when connected together, form a monotonically increasing segment contour, are sequentially chosen in the travel direction as vertex coordinates for the work-area segment contour.

In accordance with the invention, a safe zone is initially determined. The determination of the safe zone is carried-out through the definition of an axis-parallel segment contour which includes the contours of the workpiece and/or the environment of the workpiece. In addition, a segment contour is determined which describes the contour of the tool turret, e.g. the tool support including the tool and the tool holding means in the working position. In a subsequent step, the contour vertices as well as the safe zone and the tool segment contour are determined and stored as coordinate values. In order to determine an allowable work-area contour, the contour vertices of the safe zone and of the tool segment contour which were determined in the above manner are pairwise overlaid for each monotonic section assigned thereto and the coordinate values of a reference point are calculated for each overlay. Those coordinates are chosen from the coordinate values of each segment contour of a monotonic section of the safe zone which give a monotonic segment contour when combined with each other.

The invention has the advantage that a work-area is determined with little computing power within which the reference point must remain during the work process. In particular the work-area segment contour is determined through the pairwise overlay of the coordinate vertices of the safe zone and the tool segment contour using a small amount of processing data so that an online collision monitoring is facilitated without increased computer power.

In accordance with an advantageous embodiment of the invention, a travel direction is determined and the safe zone is subdivided into monotonically increasing and decreasing regions relative to this travel direction. The contour vertices are pairwise overlaid with the corresponding contour vertices of the monotonically increasing or decreasing sections of the tool segment contour for each of the monotonically increasing or decreasing regions of the safe zone and the coordinates of the reference point are calculated for each overlay. These coordinates are ordered in the travel direction for each monotonic section according to size and those coordinate points are chosen whose coordinate value in a direction perpendicular to the travel direction is larger than the previously chosen coordinate point. For monotonically decreasing sections, the points are chosen in the opposite travel direction.

In the event of a plurality of equal coordinate values in the travel direction, that coordinate point is chosen for the construction of the work-area contour which has the largest value in a direction perpendicular to the travel direction.

This embodiment of the invention allows for a straight-forward advantageous determination of the work-area in the various regions even for complex safe zone, or tool, and/or tool support shapes. The overall work-area or the overall work-area borders are defined through overlay of individual region borders.

In a further advantageous embodiment of the invention, the safe zone is calculated from the description of the components and from the structural data of the lathe. In this fashion the safe zone segment contour can be largely determined without additional data. The data which are in any event necessary for lathe processing are extracted from the component description, from the structural data, and are also used to describe the safe zone.

When running a processing program in a lathe, the tip of the tool is normally taken as the relevant reference point for processing. It is therefore also advantageous to take the tool tip as the reference point for the determination of the work-area.

In accordance with an additional advantageous configuration of the invention, the calculation of the borders of the work-area takes place during control initialization when calling the operation mode, following a change in the machine state, in the event of a tool change, or when changing tool corrections. The work-area borders are therefore always newly determined when any kind of change in the entire configuration takes place.

For processing of an NC-program, the automatic operation control advantageously checks each set of processing instructions prior to execution as to whether or not the programmed path, i.e. the tool motion, remains within the work-area. When this is not the case, an error signal can then be issued prior to the beginning of the path feed motion. In contrast thereto, no error signal is issued for hand operation and the path feed motion is only allowed up to a work-area border.

The invention is described more closely below with reference to the figures.

BRIEF DESCRIPTION OF THE DRAWING

FIG. 1b illustrates the determination of the coordinate value for the reference point Q6 for the case of FIG. 1a;

FIG. 2b shows the coordinates of individual regions for the case of FIG. 2a; and FIG. 2c shows the result of the overlay for the case of FIGS. 2a and 2b.

FIG. 1A shows the contour of a turret 1 and the safe zone 2 for a tailstock. The safe zone 2 is a segment contour which monotonically increases in the travel direction and includes vertices P1 through P4. In order to determine the work-area contour, the appropriate part of the segment contour 1 of the tool turret having vertices Q5–Q1 which monotonically increases in the travel direction is to be considered. The reference point Q6 is taken in the segment contour 1 shown. In the present case, the reference point is the tool tip. The data from which the contours 1 and 2 for the turret and the tailstock are constructed are preferentially taken from the component description and from the structural data of the lathe.

DESCRIPTION OF THE PREFERRED EMBODIMENT

Figure 1A:
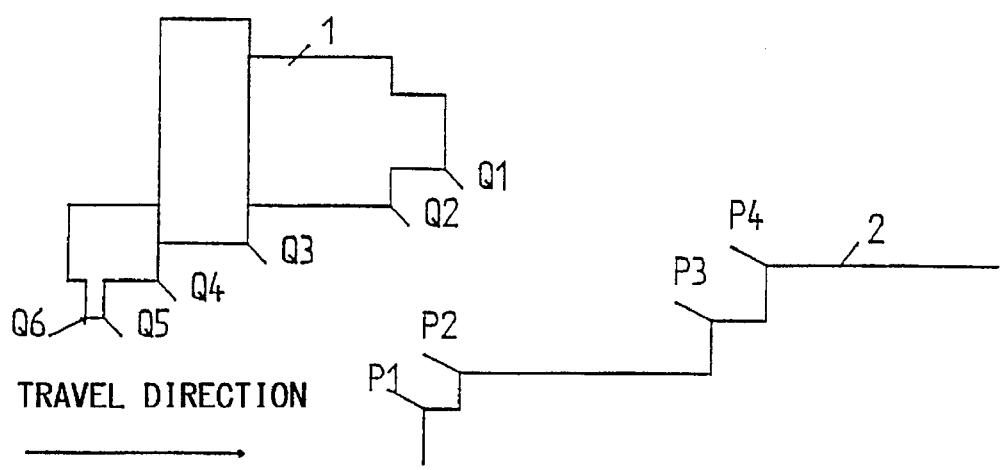
FIG. 1a shows the contour of a turret and a tailstock safe zone.
Figure 1B:
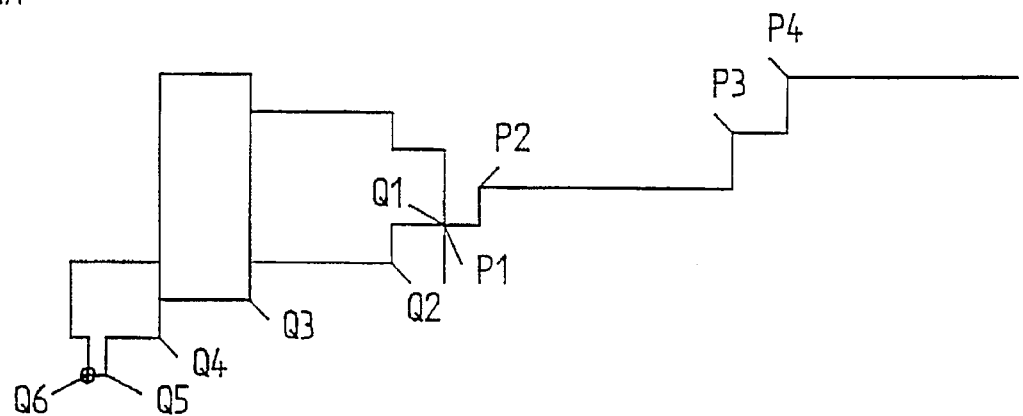

FIG. 1B shows an example for the determination of the coordinate value for the reference point Q6. Towards this end the vertices Q1 of the tool turret are overlaid with point P1 of the safe zone. The coordinates for Q6 are determined for this constellation. Remaining vertices are each pairwise overlaid in a corresponding fashion and the coordinate data for Q6 are determined.

Figure 1C:
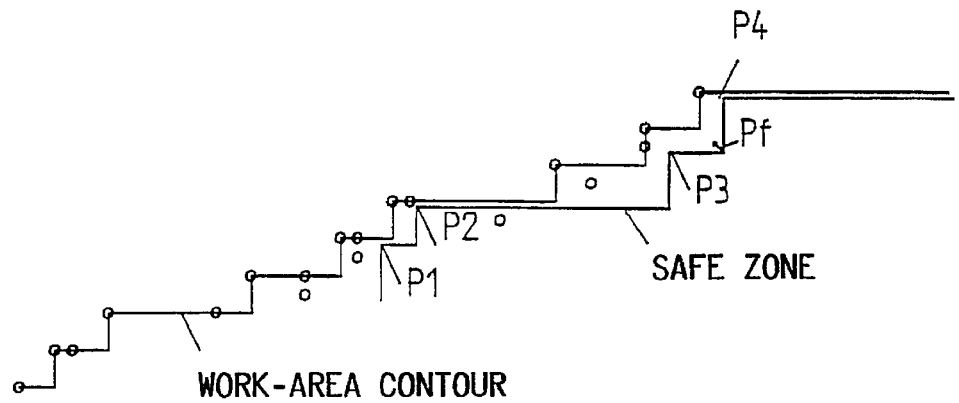
FIG. 1c illustrates the results of the determination of FIG. 1b.

The result of this coordinate determination is shown in FIG. 1C. Each of the small circles represents a coordinate value for the reference point Q6, each of which is determined by one overlay. In order to determine the work-area contour, e.g. the border line which cannot be crossed in a direction towards the safe zone by the reference point Q6, which in the present case is the tool tip, those points are chosen from all of the coordinate values for Q6 which, when connected together, describe a monotonically increasing curve. The corresponding coordinates are connected to each other in the figure. The curve resulting therefrom forms the work-area contour and is shown relative to the safe zone. For reasons of clarity, the safe zone is shown slightly displaced relative to the resulting work-area contour. The arrow Pf indicates the magnitude of the displacement and a direction opposite thereto.

It is advantageous when the monotonically increasing curve is determined by ordering the coordinate values of the reference point according to magnitude in the travel direction and by choosing those points whose coordinate value is larger than the previously chosen point in a direction perpendicular to the travel direction.

Figure 2A:
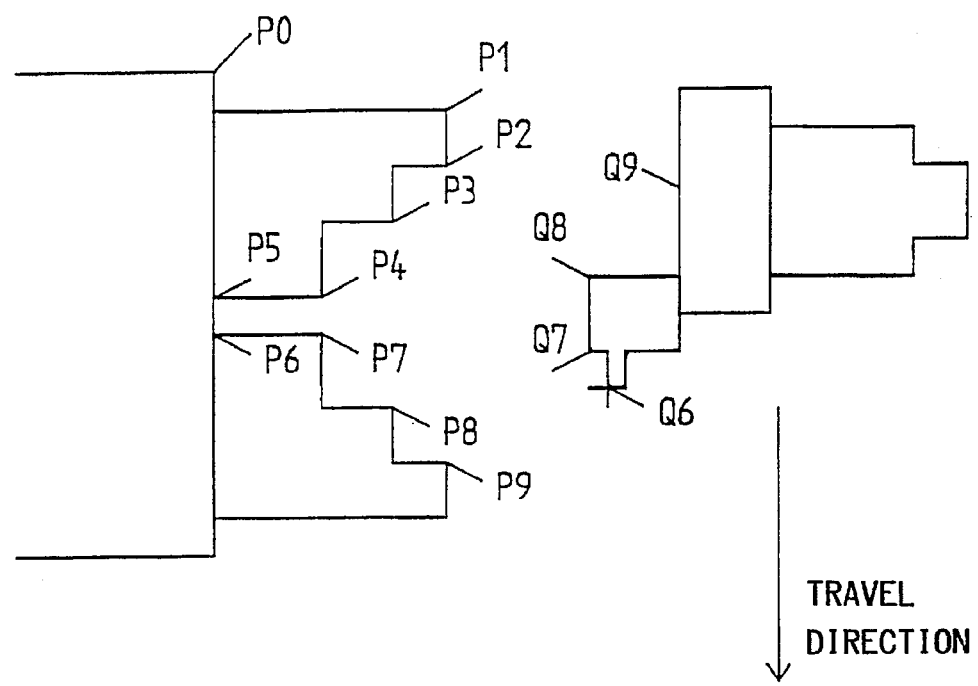
FIG. 2a shows the determination of the work-area contour relative to a tool turret for the safe zone of a chuck having clamping jaws.
Figures 2B, 2C:
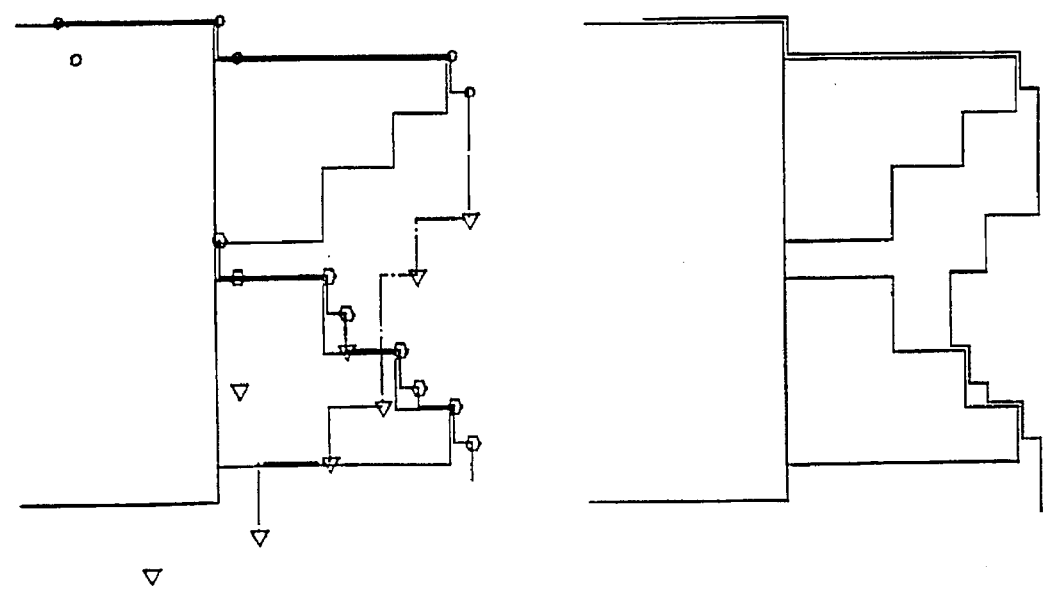

FIGS. 2a and 2b show the determination of the work-area contour relative to a tool turret for the safe zone of a chuck having clamping jaws. The safe zone is subdivided into three regions in the travel direction. The first region forms the monotonically increasing section having the vertices P0 and P1 which are overlaid with the vertices Q7 and Q6 in a monotonically decreasing contour region of the tool turret. The second region forms the monotonically decreasing section of the safe zone having the vertices P2, P3, P4 and P6 which are overlaid with the vertices Q9 and Q8 in the monotonically decreasing contour region of the tool turret contour.

The third region forms the monotonically increasing section of the safe zone having vertices P5, P7, P8 and P9 which are overlaid with vertices Q7 and Q6 in the monotonically increasing contour region of the tool turret contour.

The coordinates for the reference point Q6 are determined in each of the three regions by pairwise overlay of the corresponding vertices.

The coordinates of the individual regions determined in this manner are represented in FIG. 2B. In the first region, the coordinate points for Q6 are represented by small circles, for the second monotonically decreasing region the determined coordinate points are represented by triangles, and for the third monotonically increasing region the coordinate points are indicated by hexagons.

A monotonically increasing or monotonically decreasing curve is determined from the coordinate points for each of the three regions as described in connection with FIGS. 1a, 1b and 1c.

In this fashion three segment contours result which are overlaid in order to obtain the work-area contour. During overlay, those contour regions are chosen in, each case, which have larger values in a direction perpendicular to the travel direction. The result of the overlay is shown in FIG. 2C, whereby the safe zone is slightly displaced relative to the work-area contour for reasons of clarity.

In this case, the work-area contour also constitutes the border which cannot be crossed by reference point Q6 (the tool tip) during the working process in a direction towards the safe zone.

The work-area contour is newly determined at the beginning of each work stage and in the event of a change in the machine state; for example, a tool change. For automatic execution of an NC-processing program, a collision check is carried-out prior to each set of path feed instructions. If it is determined in the course of such a collision examination that the work-area defined by the work-area contour is violated, an error signal is immediately issued. In the case of hand-operation, moving of the tool tip up to the work-area contour is permitted and a crossing of the border is not possible.

We claim:

1. A method for calculating a two-dimensional work-area contour for a reference point of a tool segment contour to monitor a safe zone for a numerically controlled lathe, the method comprising the steps of:

specifying the safe zone by determining an axis-parallel segment contour of a workpiece;

defining the tool segment contour for tool portions and for a tool support located on a side facing the safe zone;

determining outer safe zone contour vertices and outer tool segment contour vertices;

storing said safe zone and said tool segment vertices; overlaying said safe zone vertices and said tool segment vertices in a monotonically increasing safe zone;

calculating a coordinate value for each overlay of said safe zone and said tool segment vertices;

sequentially choosing said coordinate values which, when connected together, form a monotonically increasing segment contour in a travel direction; designating said sequentially chosen values as work-area contour vertices; and determining the work-area contour from said work-area contour vertices.

2. The method of claim 1, further comprising the steps of:

defining a travel direction for a non-monotonic safe zone;

dividing said non-monotonic safe zone into monotonically increasing and monotonically decreasing regions relative to said travel direction; pairwise overlaying, for each monotonically increasing and decreasing region, said tool segment vertices and safe zone contour points;

determining reference coordinate points for each pairwise overlay;

ordering said coordinate points relative to said travel direction according to size; and selecting said coordinate points having coordinate values in a direction perpendicular to said travel direction larger than a previously chosen coordinate point.

3. The method of claim 2, wherein in the event of a plurality of equal reference coordinate points in said travel direction, that coordinate point is selected having a largest value in said direction perpendicular to said travel direction.

4. The method of claim 1, further comprising the step of extracting data for determination of the safe zone from a component description and from structural data of the lathe.

5. The method of claim 1, wherein a tool tip is chosen as the reference point.

6. The method of claim 1, further comprising the step of newly determining the work-area contour following one of control initialization, calling of an operation mode, changing a machine unit, changing a tool, and changing a tool correction.

7. The method of claim 1, further comprising the steps of checking by means of automatic operation control, for a given NC-programming path instruction set and prior to executing program steps, if motion takes place outside the work-area contour, and issuing an error message if such is the case.

8. The method of claim 1, further comprising the step of allowing a path free motion up to the work-area contour in a hand-operation mode.

* * * * *